Figure 1:
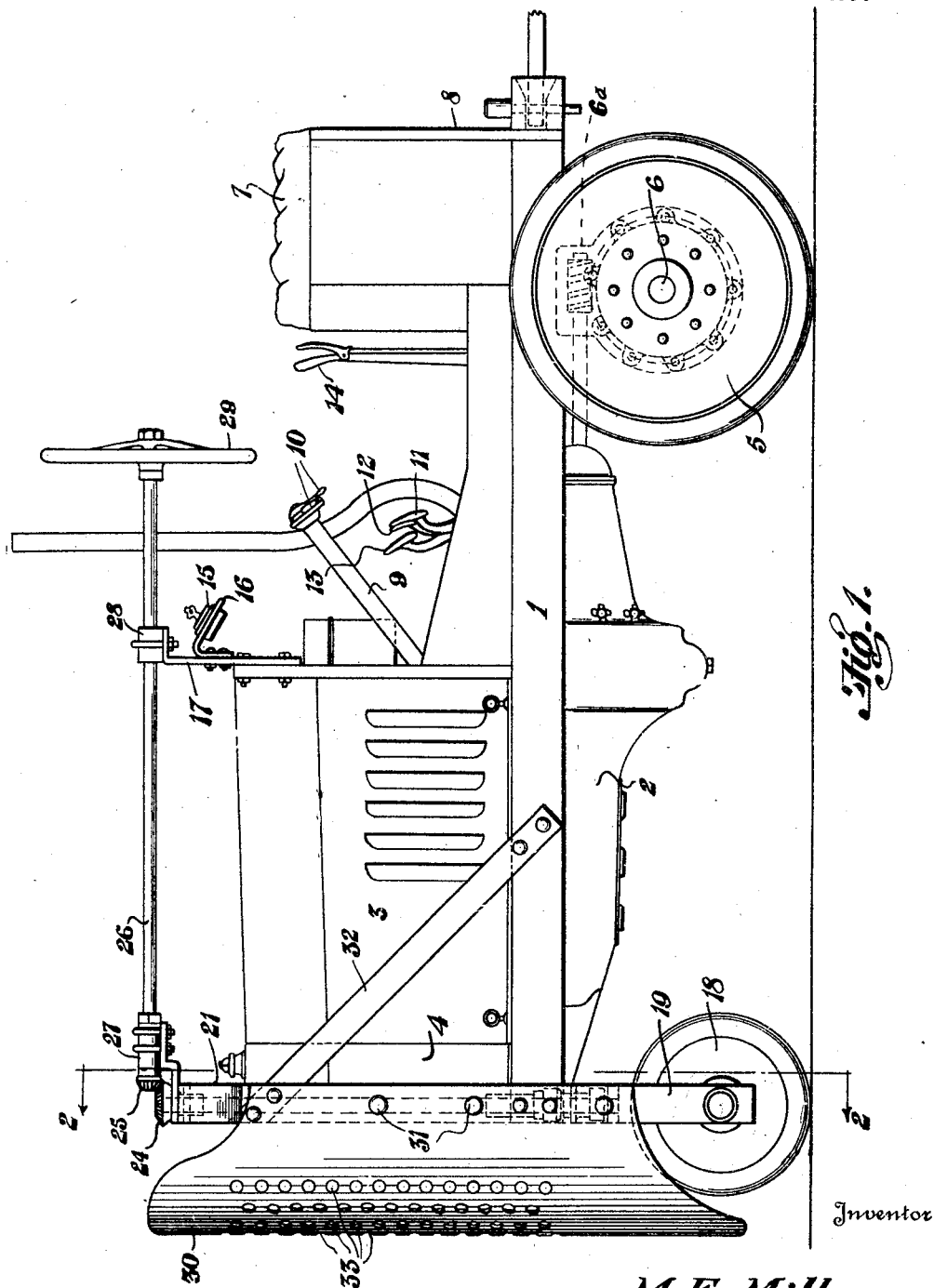

Nov. 20, 1928.

M. E. MILLER 1,692,342

TRACTOR

Filed Sept. 16, 1925  2 Sheets-Sheet 1

Inventor
M. E. Miller.
By Fream and Bond
Attorneys

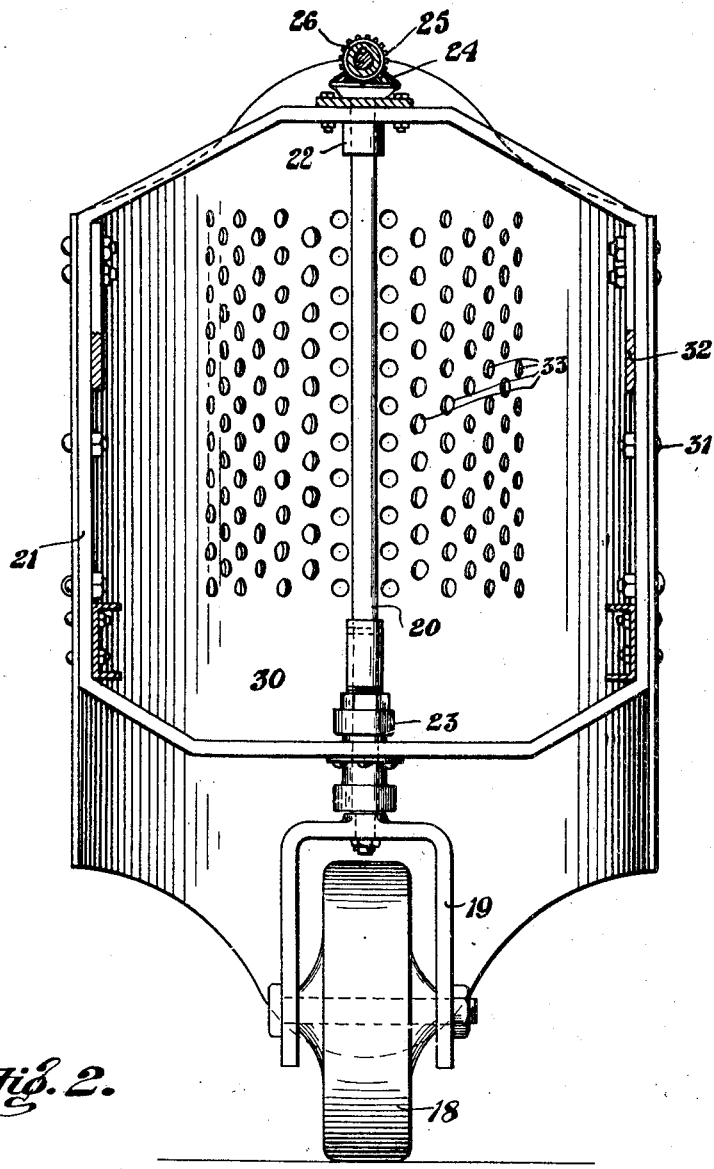

Patented Nov. 20, 1928.

1,692,342

UNITED STATES PATENT OFFICE.

MORRELL E. MILLER, OF WARREN, OHIO.

TRACTOR.

Application filed September 16, 1925. Serial No. 56,729.

The invention relates to that type of tractors known as industrial tractors, for use in factories, mills, shops and similar places; and the object of the improvement is to provide a simple and efficient three-wheeled tractor having two driven wheels and one wheel by means of which the tractor is steered; the improvements consisting in certain novel features of the steering mechanism and a curved perforated bumper plate for protecting the radiator and admitting the air for cooling the engine.

An embodiment of the invention is illustrated in the accompanying drawings in which Fig. 1 is a side elevation of the improved tractor and Fig. 2 a transversed vertical section taken substantially upon the line 2—2 Fig. 1.

Similar numerals of reference indicate corresponding parts throughout the drawings.

The frame 1 supports an internal combustion motor 2 of any usual design, which is enclosed by the hood 3, provided with the usual radiator 4.

The rear wheels 5 are carried upon an axle 6, mounted beneath the frame and arranged to be driven through any usual connection with the motor 2, as indicated generally at 6ª.

The driver's seat 7 is mounted upon the rear portion of the frame and arranged to enclose a gasoline tank, for supplying fuel to the motor, which is protected by the rear bumper plate 8. A control column 9 extends upward and rearward from the motor to a point convenient to the driver's seat, and is provided with gas and spark control levers 10.

The clutch, brake, and reverse pedals, 11, 12, and 13 respectively, are operatively connected to the drive mechanism and brake of the tractor in usual manner and located in a position to be conveniently operated from the driver's seat and the hand brake lever 14 is normally located in a position adjacent to the seat.

The ignition switch 15 may be supported upon a bracket 16 carried by the frame 17 which extends upward above the rear end of the hood.

A single front traction steering wheel 18, preferably of considerably smaller diameter than the rear wheels, is journaled in a fork 19 carried upon the lower end of the vertical shaft 20. This shaft is carried by the substantially rectangular vertical front frame member 21, the upper end of the shaft being preferably journaled in a bearing 22 mounted in the top of the frame while the lower portion of the shaft is journaled in roller bearings 23 located above and below the lower portion of the frame.

A bevel pinion 24 is fixed upon the upper end of the shaft 20, and meshes with a similar pinion 25, upon the forward end of the horizontal steering shaft 26, said shaft being journaled through bearings 27 and 28 carried by the frame members 21 and 17 respectively. A steering wheel 29, of any usual form, may be fixed upon the rear end of the steering shaft in a position convenient to be operated from the driver's seat.

For the purpose of protecting the front portion of the tractor from being damaged by collision a bumper plate 30 is provided, which may be curved as illustrated in the drawings and extended, from the level of the gears 24 and 25, to a point below the center of the front wheel 18.

This plate may be connected to the front frame member 21 as by bolts 31 or the like. It should be noted that the frame 21 is connected near its lower end to the main side frames 1 of the car and the upper portion of said frame is connected to the angular struts 32 which are connected to the frames 1 at points spaced from the forward end of the car.

In order to provide sufficient air to the radiator 4, to properly cool the same, the bumper plate 30 is provided with a multiplicity of openings 33 covering a space substantially conforming to the size and shape of the radiator.

I claim:

A tractor, having an internal combustion engine mounted on the frame of the tractor at its forward end, a radiator in front of said engine, a substantially rectangular frame mounted vertically in front of the radiator at the forward end of the tractor frame, a vertical shaft carried by the rectangular frame, a traction steering wheel carried by said shaft, and a curved bumper plate connected to said rectangular frame and extending in front of the radiator and wheel and provided with a series of perforations in front of the radiator.

In testimony that I claim the above, I have hereunto subscribed my name.

MORRELL E. MILLER.